May 31, 1966 R. J. STATEN 3,254,335
RESERVATION SIGNALLING SYSTEMS
Filed July 11, 1960 2 Sheets-Sheet 1
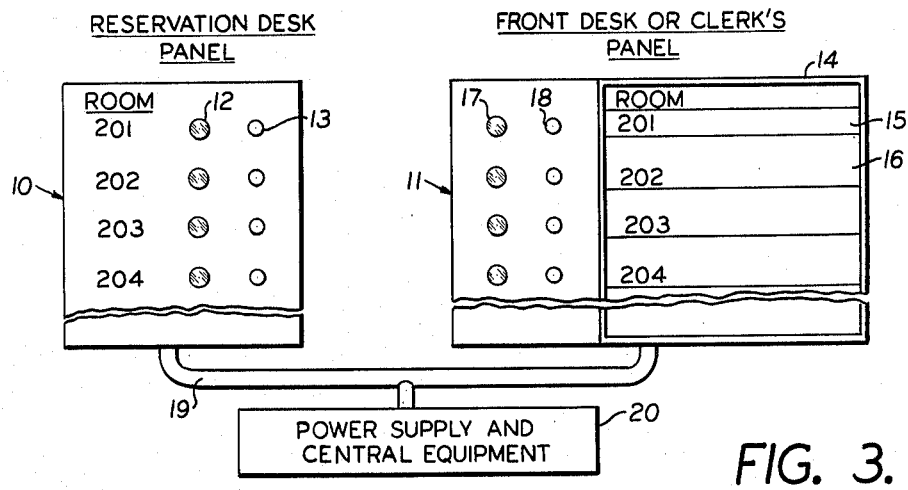
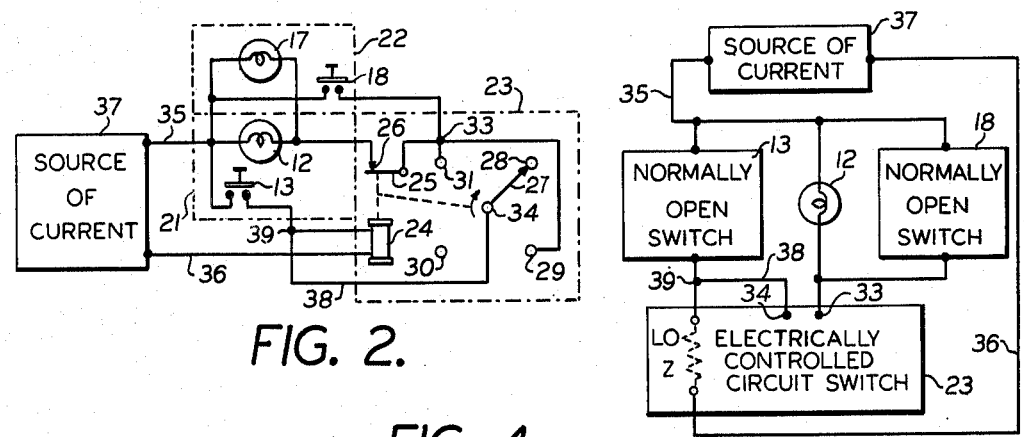
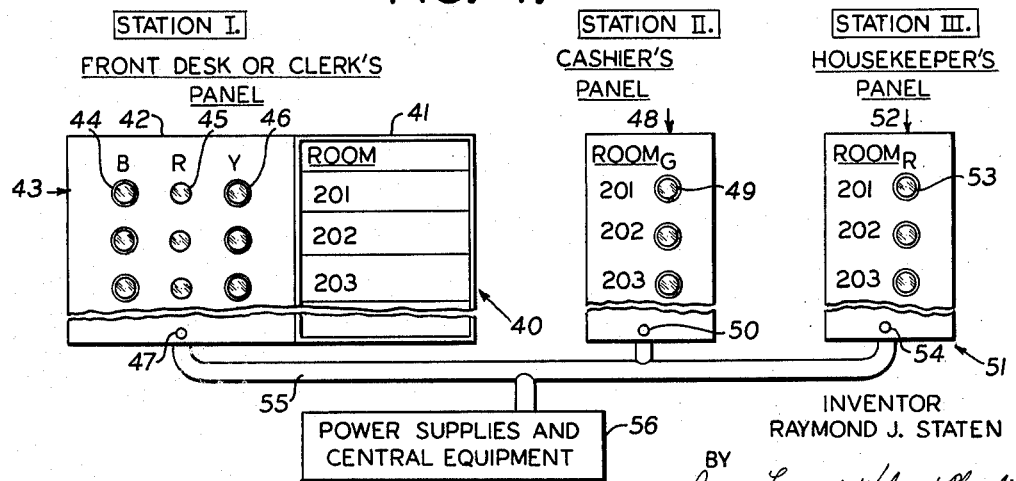
INVENTOR
RAYMOND J. STATEN
BY Byerly, Townsend, Watson & Churchill
ATTORNEYS.

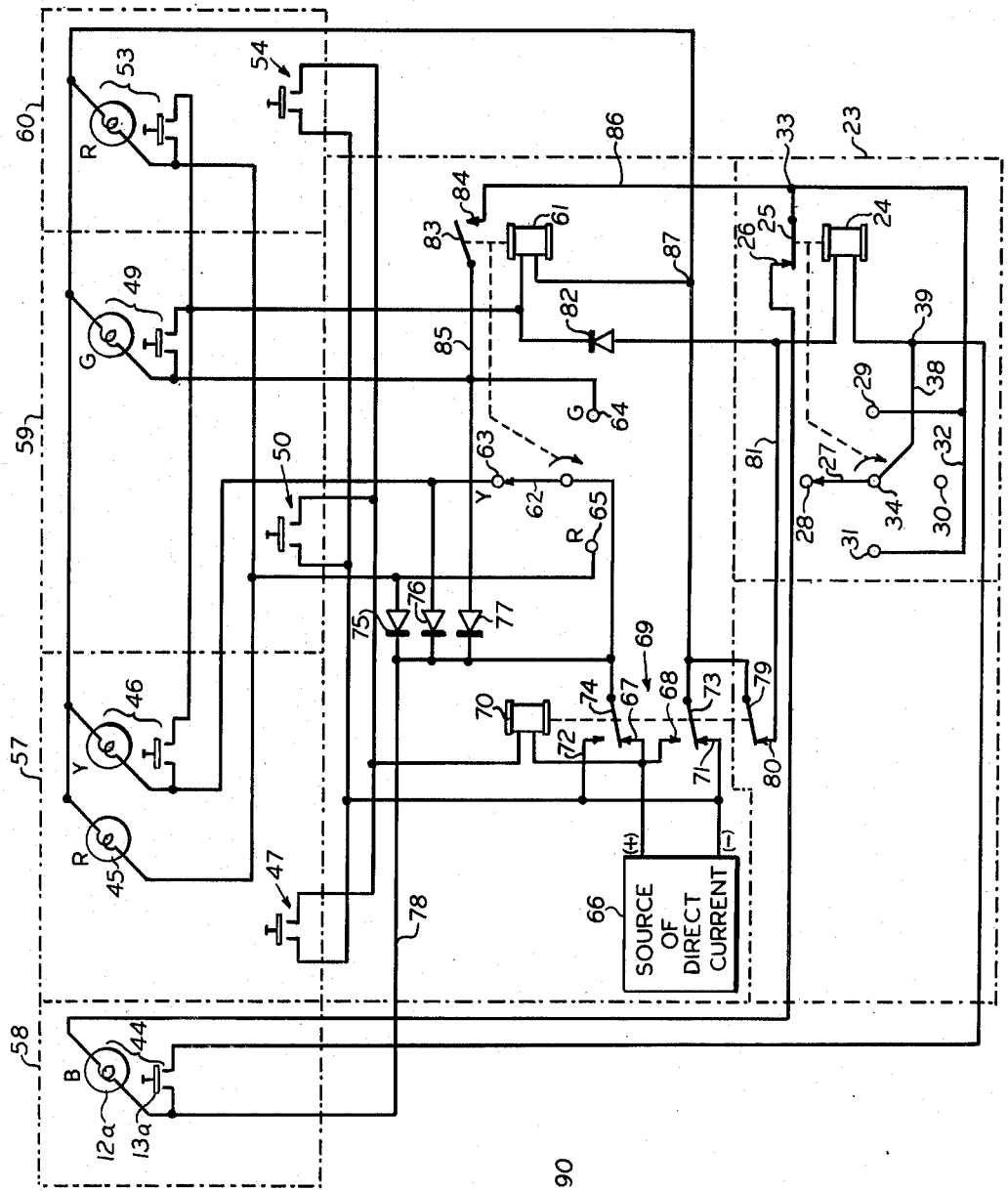

United States Patent Office 3,254,335
Patented May 31, 1966

3,254,335
RESERVATION SIGNALLING SYSTEMS
Raymond J. Staten, Port Washington, N.Y., assignor to Master Video Systems, Inc., Port Washington, N.Y., a corporation of Delaware
Filed July 11, 1960, Ser. No. 41,882
6 Claims. (Cl. 340—286)

The present invention relates to an electrical signalling system and more particularly to apparatus for recording or registering the reservation status of hotel rooms, space accommodations, or the like.

The handling of seating on public conveyances and room space in hotels or the like, to cite just two examples, requires the maintenance of extensive and accurate records which are continually changing. Although various systems have been proposed in the past, they have not proven very successful, and most reservation records are still maintained by handwritten entries.

As basic to a good reservation system it is necessary that means be provided for making and cancelling reservations independent of the actual filling of the reservation, while at the same time some provision be made for clearing a reserved status when the reservation is picked up or filled. The present invention provides a relatively simple and economical system for fulfilling these needs.

The present invention, generally speaking, is not limited in its application to the maintenance of hotel records; however, certain aspects of it are peculiar to or especially adapted for use with an overall system for supervising other functions or operations of a hotel such as those of the desk clerk, cashier and housekeeper.

In accordance with an aspect of the invention, there is provided an electrical signalling system for supervising room reservations and rental in a hotel or the like which comprises a separate control device for each room of the hotel, a control board including for each of the rooms first and second manually operable devices and an associated indicating means, and means interconnecting the manually operable devices and indicating means for each room with the respective control device for the room such that successive actuation of one of said first manually operable devices causes its associated indicating means to alternate between two conditions of operation for registering respectively, the making and cancellation of a reservation for the corresponding room, and actuation of one of the second manually operable devices when the associated indicating means is in the condition registering that a reservation has been made causes a change in the condition of the last mentioned indicating means for indicating the filling of the reservation.

A basic component arrangement for use in the aforementioned system comprises an electrically controlled circuit switching device having a low impedance input and having an output which is alternately opened and closed circuited, a source of electrical energy, a first normally open switch means connected in series with the low impedance input across the source, an electrical indicating device connected in series with the output across the first switch means, and a second normally open switch means connected across the indicating device.

In order that my invention will be fully available to those skilled in the art, the following detailed description of both a simplified and a preferred embodiment thereof, and modifications which may be incorporated therein, is given with reference to the appended drawings in which:

FIG. 1 is a diagrammatic representation of a simplified signalling system as applied to the reservation of hotel room space in accordance with the invention;

FIG. 2 is a schematic circuit diagram showing one set of components which can be used in the system of FIG. 1;

FIG. 3 is a block diagram for aiding in an understanding of the basic components of the circuit of FIG. 2;

FIG. 4 is a diagrammatic representation of a signalling system for supervising the functions and operation of a hotel and represents the preferred embodiment in accordance with the invention;

FIG. 5 is a schematic circuit diagram showing one set of components for use in the system of FIG. 4; and FIG. 6 is a fragmentary schematic circuit diagram showing a modification in the circuit of FIG. 5.

Referring now to FIG. 1 there is shown therein the necessary equipment for use in a simplified reservation system as applied to hotel management. It is assumed that this system is applied to the management of a large hotel wherein a separate clerk maintains a record of room reservations while the front desk clerk handles the filling of reservations or room rental. Thus, there is provided a first panel board designated generally by the numeral 10 for use at the reservation desk and a second panel board 11 for use at the front desk or clerk's position.

The panel board 10 is provided, for each room, with a signal lamp or indicating means and a manually operable device or push-button switch, e.g., lamp 12 and switch 13.

The panel board 11 is associated with a room rack section 14 having a number of slots, one for each room of the hotel, such as the slots 15 and 16 bearing the corresponding room numbers 201, 202, and so forth. In the use of this part of the rack, the desk clerk, when he rents a room, fills out a card with the name of the occupant, his address, the rate of the room and the estimated duration of stay. This card is then slipped into the appropriate slot in the section 14 of the panel 11. Adjacent the section 14 there is for each room a signal lamp or indicating means and a manually operable device or push-button switch. For room 201 the lamp is designated 17 and the switch is designated 18.

The two panels are interconnected by cabling through conduits 19, or the like, with the power supply and central equipment 20.

Before discussing the operation of the system of FIG. 1, reference should be had to FIG. 2 which illustrates details of the circuit. For convenience, only the equipment associated with one room is illustrated, it being understood that the circuit for each room is the same. Where appropriate, the reference numerals which are used in FIG. 1 are also used in FIG. 2 to designate the same or similar parts.

Considering the equipment for room 201, that shown within the box 21 represents the equipment in the reservation and desk panel 10, while that shown in box 22 represents the equipment in the front desk panel 11. An electrically controlled circuit switching device for the room is shown within the box 23. The switching device includes an electrical relay having a solenoid 24 with low internal resistance, say 2 to 3 ohms, an armature 25 cooperating with a fixed contact 26 to provide a pair of normally closed contacts which open when the solenoid is energized, and an indexable wiper or contact 27 which is stepped by the solenoid 24 into successive engagement with the fixed contacts 28, 29, 30 and 31. The contacts 28 and 30 represent neutral or dead positions while the contacts 29 and 31 are connected to a junction point or terminal 33. Electrical connection to the wiper 27 is made through the terminal 34. Referring to the terminals 33 and 34, it will be apparent that they can be considered as representing a pair of output terminals joined by contacts which sequence alternately between opened and closed positions in response to successive energization of the solenoid 24. It will be understood that as the solenoid 24 is energized it will attract its armature 25 which after about one quarter travel towards the fully attracted position will break contact with the fixed contact 26. When the armature 25 approaches its fully attracted position it will, by means of a mechanical escapement, advance the wiper 27 to the next fixed contact in succession. That is, energization of solenoid 24 with the contacts in the position shown in FIG. 2 will cause wiper 27 to advance to contact 29. When the solenoid 24 is de-energized the wiper will remain on contact 29 while the armature 25 will return to its original position engaging the contact 26 toward the end of its travel.

As seen in FIG. 2, the normally open switch 13 in series with the solenoid 24 is connected by the conductors 35 and 36 across the source of current 37. The lamp 12 is connected between the conductor 35 and the fixed contact 26 of the control device 23. The terminal 34 of the device 23 is connected by the conductor 38 to the point 39 which represents the junction between the solenoid 24 and the switch 13. Thus, the lamp 12 is connected in series with the output terminals 33 and 34 across the switch 13. It will also be noted that the switch 18 is connected between the terminal 33 and the junction between the conductor 35 and the lamp 12 so as to be connected effectively across the lamp 12. The signal lamp 17 is connected directly in parallel with the signal lamp 12, as shown.

The operation of the circuit of FIG. 2 will now be described. With the circuit in the condition as shown in the drawing, both signal lamps 12 and 17 will be extinguished. Operation of switch 18 at this time will have no effect upon the circuit. However, should the switch 13 be closed, it will complete a circuit from the source 37 through the conductor 35 to the point 39 and through the solenoid 24 and conductor 36 back to the source 37. This will cause the solenoid 24 to be energized and remain energized as long as switch 13 is maintained closed. The armature 25 will be attracted breaking the circuit with contact 26. At the same time, the wiper 27 will be advanced to engage the fixed contact 29. Nothing further will occur in the circuit until the switch 13 is released. Upon this action taking place, the circuit through the solenoid 24 will be completely interrupted momentarily. Armature 25 will be released and will in some finite time return to its position in engagement with contact 26. The time, of course, will be of the order of microseconds. When armature 25 engages contact 26 it will complete a circuit from the source 37 through conductor 35, lamp 12, to the terminal 33, and through contact 29, wiper 27, terminal 34, connection 38, junction 39, solenoid 24, connection 36, back to the source 37. It was mentioned previously that the resistance of the solenoid 24 is very low. Since the normal resistance of an incandescant lamp is comparatively high, most of the voltage of the source will be effective across the lamp in order to cause it to illuminate. However, the current through the lamp, although it flows through the solenoid 24, will be insufficient to cause the solenoid to attract its armature 25 away from its position of engagement with contact 26. It should be understood that the lamp 17 will be illuminated at the same time since it is in parallel with the lamp 12.

The purpose of the contact 26 is to prevent the relay from becoming "hung up" due to current flowing through the lamps 12 and 17. In the absence of the contact 26, the lamps 12 and 17 would become energized as soon as the wiper 27 engaged the contact 29. This would occur with the armature fully attracted to the solenoid 24. Now when the switch 13 is released there might be sufficient current flowing through the lamps 12 and 17 to prevent the solenoid 24 from releasing the armature 25. However, if the lamps are not placed in circuit until the armature 25 has travelled a substantial distance from the solenoid 24, the current then will not be sufficient to cause the armature 25 to be reattracted.

With the wiper 27 engaging contact 29, the lamps 12 and 17 will be illuminated. If the switch 13 is closed for a second time it will again complete a circuit through the solenoid causing the latter to advance the wiper 27 to the dead contact 30. This will serve to extinguish the lamps 12 and 17. However, instead of closing the switch 13, it is possible to close the switch 18 with the wiper 27 engaging contact 29 so as to complete a circuit for energizing solenoid 24. This circuit can be traced from the source 37 through conductor 35, switch 18, terminal 33, contact 29, wiper 27, terminal 34, conductor 38, junction 39, solenoid 24, conductor 36 back to source 37. Once the switch 18 has advanced the wiper 27 to a dead position such as contact 30, it is no longer able to cause further operation of the circuit until switch 13 is closed once again.

With this operation of the circuit of FIG. 2 in mind, it is now possible to consider the operation of the information or control panels of FIG. 1. Independently of what is taking place at the front desk or clerk's position, the clerk at the reservation desk can make or cancel a reservation for a particular room. He accomplishes this for room 201, for example, by depressing the button or switch 13 to illuminate the signal lamp 12. This will indicate that room 201 is reserved. If a cancellation order comes in he merely depresses the switch 13 a second time so as to extinguish the lamp 12. At the same time, the same information is communicated to the front desk by illuminating the lamp 17. In this manner, the clerk at the front desk will know whether or not a particular room is reserved. When the person holding the reservation calls at the front desk for the room, the clerk there will be able to confirm such status by examining the panel 11 and will signal that the room has been rented and the reservation filled by depressing or operating the appropriate switch. In the case of room 201, this would be the switch 18. If room 201 was reserved as signalled by illumination of lamp 17, the operation of switch 18 would cause the lamp 17 to be extinguished.

For convenience in understanding the basic requirements of the circuit of FIG. 2, reference should now be had to FIG. 3. The same reference numerals employed in FIG. 2 are now employed in FIG. 3 to designate the equivalent components. It can be quickly observed from FIG. 3 that the normally open switch 13 is connected in series with the low impedance input of the electrically controlled circuit switch 23 across the source of current 37. Also apparent is the fact that the lamp 12 is connected in series with the terminals 33 and 34 (the output terminals of the electrically controlled circuit switch 23) across the normally open switch 13. At the same time, the normally open switch 18 is connected across the lamp 12.

The concepts implicit in the systems described with reference to FIGS. 1 to 3 can be applied to a comprehensive or integrated hotel supervisory system such as that illustrated diagrammatically in FIG. 4. As shown therein, at Station I the desk clerk is provided with a front desk or clerk's panel designated generally by the numeral 40. The panel is divided into two sections 41 and 42. The section 41 is in the form of a rack having a number of slots similar to that described in connection with FIG. 1. A row, 43, of signal lamps 44, 45 and 46 is mounted in the section 42 adjacent the slot for room 201. In like manner, a similar row of three lamps is provided for each of the other rooms. Although all of the lamps may be of one color it is preferable that each column be of a different color. For the purpose of illustration, it will be assumed that all the lamps in the column containing lamp 44 are blue. The column containing lamp 45 may have red lamps, whereas the column containing lamp 46 may have yellow lamps. In the appended drawings, in lieu of actual colors, the letters B, R, and Y have been inserted at the top of each column as a color symbol. The letters, of course, would not appear on the actual equipment.

The signal lamps in both the blue and yellow columns are of the type which consist of a combination push-button switch and indicator lamp. The push-button is made of translucent material and can be illuminated by an associated lamp. It is believed that these are well-known and need not be described in detail. When, however, mention should be made hereinafter of pushing one of the lamps, it will be understood that it is the switch associated therewith that is being actuated.

In addition to the push-button switches already mentioned, there is provided a separate push-button switch of conventional construction, 47, which may be at the bottom of the section 42 in the panel 40. This is a test switch and has a further function, all of which will be described in further detail hereinafter.

A panel is provided at Station II for the use of the cashier consisting of a column 48 of combination push-button switches and green signal lamps, one for each room. Room 201, for example, is provided with the combination lamp-switch 49. A test switch in the form of a push-button switch 50 is provided at the bottom of the panel.

Station III is provided for the housekeeper in the form of a panel 51. If there is more than one housekeeper in the hotel, or if it is desired to have individual floor supervision or the like, the panel may contain supervisory equipment only for those rooms under the control of the particular housekeeper. Additional panels at further stations would be provided for the remaining rooms. The housekeeper's panel contains a column 52 of combination signal lamps and push-button switches with the combination arrangement for room 201 designated 53. A push-button switch 54, for the same purpose as switches 47 and 50, is also provided in the panel at Station III.

All of the panels are interconnected by cabling through conduits 55, or the like, with the power supplies and central equipment 56. Although not shown, additional panel boards may be interconnected with the central equipment 56 for providing monitoring information at other stations. In a hotel, such a panel could be located in the office of the manager and contain a set of signal lamps duplicating those on both the front desk panel and the cashier's panel.

Reference should now be had to FIG. 5 which illustrates details of the circuit. For convenience, only the equipment associated with one room is illustrated, it being understood that the circuit for each room is the same. Where appropriate, as with FIGURES 1 to 3, the reference numerals which are used in FIG. 4 are also used in FIG. 5 to designate the same or similar parts.

Considering the equipment for room 201, that shown within the boxes 57 and 58 represents the equipment at Station I. Box 59 represents the equipment for the cashier's panel including the combination signal lamp and switch 49 and the test switch 50. The combination red lamp and push-button switch 53 located at the housekeeper's panel is shown within the box 60. As part of the central equipment, there is provided a sequencing device in the form of an electro-mechanical stepping switch having a solenoid 61, a wiper arm 62, and three fixed contacts 63, 64 and 65. It is to be understood that each time a voltage impulse is applied to the solenoid 61, the wiper arm 62 is advanced one step from one fixed contact to the next. A source of direct current 66 of suitable voltage to energize the stepping switch and signal lamps has its positive terminal connected to the fixed contacts 67 and 68 of a relay 69 and through the relay winding 70 to one terminal of each of the switches 47, 50 and 54. The opposite terminals of the switches 47, 50 and 54 are joined together and connected to the negative terminal of the source 66. The latter terminal is connected, in turn, to the fixed contacts 71 and 72 of relay 69, all as shown in the drawing.

It will be seen that all of the signal lamps as well as the solenoid 61 have one terminal connected to the armature 73 of relay 69. The second armature 74 of the relay is connected both to the wiper arm 62 and to the cathodes of three rectifiers 75, 76 and 77. The anodes of rectifiers are connected, respectively, to the fixed contacts 63, 64 and 65 of the sequencing switch. The green lamp 49 has its other terminal connected to the contact 64 of the sequencing switch. The two red lamps 45 and 53 have their other terminals joined together and connected to the fixed contact 65 of the sequencing switch. Finally, the yellow lamp 46 has its other terminal connected to the fixed contact 63 of the sequencing switch. All of the push-button switches 46, 49 and 53 have one terminal joined together and connected to the free end of the solenoid 61. The other end of the switch 46 is connected to the fixed contact 63 of the sequencing switch. In similar manner the other end of the switch 49 is connected to the fixed contact 64, and the other end of the switch 53 is connected to the fixed contact 65 of the sequencing switch.

The operation of the foregoing portion of the circuit with the exception of the components included in box 58 can now be described. With the sequencing switch and the relay 69 in the position shown in the drawing, a circuit is completed from the positive terminal of the source of direct current 66 through contact 67 and armature 74 to the wiper 62 and then through the yellow lamp 46 to the armature 73 and through contact 71 to the negative side of the source. Thus, the yellow lamp is illuminated. In the system under discussion, it will be assumed that this will convey to the clerk at the front desk the information that the room is ready for occupancy. When the clerk has rented the room in question, he will push the button 46 closing the switch associated therewith. This will complete a circuit from the fixed contact 63 of the sequencing switch through the switch 46 and through the solenoid 61, armature 73 and contact 71 to the negative terminal of source 66. This will advance the sequencing switch to the next contact 64. In this manner the yellow lamp is extinguished and the green lamp 49 is illuminated. At the same time, the switch 46 is removed from the circuit, while the switch 49 is connected to the source of direct current ready to energize the solenoid 61 upon closure thereof. The illuminated green lamp conveys the information to the cashier that the room is rented.

When the occupant of the room in question checks out, he will pay his bill to the cashier. At this time the cashier will depress the switch 49 associated with the room and complete an energizing circuit for the solenoid 61. This will advance the sequencing switch one more step to the fixed contact 65. In this position, the red lamps 45 and 53 are illuminated and the switch 53 at the housekeeper's station is now ready to advance the sequencing switch. Since the switch 49 is no longer connected to the source of current it can not falsely or improperly advance the sequencing switch. The same is true of course of the switch 46 at the front desk position.

With contact 65 of the sequencing switch engaged by the wiper 62, the red lamps are illuminated, as mentioned above, and the housekeeper is informed that the occupant of the room has checked out and that the room should be readied for another occupant. This same information is communicated to the front desk clerk. When the maid has finished with her work and so informs the housekeeper, the latter presses the button 53 associated with the room and this completes a circuit through the solenoid 61 to advance the wiper 62 back to the initial position on contact 63 illuminating the yellow lamp. This informs the clerk at the front desk that the room is now ready for occupancy again. It should be understood that the position of the various lamps in different columns normally would be sufficient to convey the desired information. However, the use of colored lamps is desirable for easier observation.

When it is desired to test the operativeness of all of the lamps on a particular panel board all that is required is to depress the associated test switch. Thus, for example, the cashier would close the switch 50. Closure of any one of switches 47, 50 and 54 which are connected in parallel will energize the winding 70 of relay 69. When winding 70 is energized it will move the armatures 73 and 74 to break contact with contacts 67 and 71 and engage contacts 68 and 72. This reverses the polarity of the voltage applied to the rectifiers 75, 76 and 77 such that each is rendered conductive, by-passing the stepping switch. By tracing the circuit it will be seen that all of the signal lamps on all of the panel boards are energized simultaneously regardless of the position of the sequencing switch. As mentioned previously, this discussion does not include the blue signal lamp 44 in box 58. In this manner, any defective lamp can be readily detected. Upon release of the test button the relay 69 will be de-energized and the armatures 73 and 74 will return to the positions shown in the drawing. This reestablishes the condition prevailing immediately prior to the test.

Besides being used for test purposes, the switches 47, 50 and 54 have another function. Although most errors are ruled out by the very nature of the present signalling system, it still is desirable to have some arrangement for correcting those few which are unavoidable. It may be that a prospective occupant at the time of registering changes his mind with respect to a particular room. The clerk at the front desk may already have pushed the button signifying that the room has been occupied. With the circuit of FIG. 5 it is possible to effect a convenient correction of the system.

When a test switch such as 47 is closed causing the relay 69 to operate, all three rectifiers 75, 76 and 77 will be rendered conductive. Now assume that while holding button 47 depressed, the clerk at the front desk were to push the button 46. This will complete a circuit from the positive terminal of the source 66 through contact 68, the armature 73, the solenoid 61, switch 46, rectifier 76, armature 74, contact 72, back to the negative terminal of the source 66. In other words, the stepping switch has been by-passed such that regardless of its position the closure of room switch 46 will energize the solenoid 61 to advance the stepping switch to its next position. By repeating this procedure of simultaneously operating the test button and the room button it is possible to completely re-cycle the sequencing device and reset it to any desired position.

The equipment described thus far with reference to FIG. 5, with the exception of that shown in box 58, is substantially the same as that disclosed and claimed in my copending application Serial No. 798,543, filed March 10, 1959, now Patent No. 2,980,890, and assigned to the same assignee as the present application. The present invention, however, relates to the reservation equipment previously described with reference to FIGURES 1, 2 and 3 and to the manner in which it is incorporated as a part of the overall supervisory equipment. To facilitate comparing the components in FIG. 5 with those in FIG. 2, the same reference numerals will be employed where the identical equipment is involved. It will be seen that the electrically controlled circuit switch is incorporated bodily within box 23. In order to distinguish between the separate nature of the lamp 12 and switch 13 in FIG. 2 and the combination arrangement in FIG. 5 the lamp and switch forming a part of the combination 44 in FIG. 5 will be designated 12a and 13a, respectively. A conductor 78 joins the junction between switch 13a and lamp 12a with the armature 74 of the relay 69. In this manner, for the illustrated position of relay 69, the aforesaid junction between the lamp 12a and switch 13a is coupled through armature 74 and contact 67 to the positive terminal of the source 66. This connection is similar to the connection 35 illustrated in FIG. 2.

The path 36 in FIG. 2 between the source of current 37 and the solenoid 24 is replaced in FIG. 5 by the path from the negative terminal of the source 66 through contact 71 and armature 73 of relay 69 to a third armature 79 of relay 69. The armature 79 of relay 69 normally engages a fixed contact 80 which is coupled by the conductor 81 to one side of the solenoid 24. The purpose of the armature 79 and contact 80 will be explained hereinafter. Also to be explained is the function of the rectifier 82 which is connected between the conductor 81 and the upper terminal of the solenoid 61, and the additional armature 83 and fixed contact 84 associated with the solenoid 61. It will be noted that the armature 83 is connected by a conductor 85 to the fixed contact 64 of the sequencing switch. The fixed contact 84 is connected over conductor 86 to the terminal 33. Assuming for the moment that the armature 83 is in engagement with the contact 84, and bearing in mind that wiper 62 and fixed contact 64 may be construed as a normally open switch, it will be seen that a circuit can be traced from the positive terminal of source 66 through the normally open switch involving elements 62 and 64 directly to the terminal 33. This circuit should be compared with the circuit involving the switch 18 in FIG. 2.

In the circuit of FIG. 5, the solenoid 61 is arranged to operate the armature 83 and wiper 62 in a manner quite analogous to the operation of the solenoid 24. The armature 83 and contact 84 are arranged to close during the last three quarters of the down travel of the former and to remain closed during the first three quarters of its up travel. It will be understood that the reservation elements involving the switch 13a and lamp 12a, as well as the low impedance electrically controlled switch 23, will function in the same manner as the circuit of FIG. 2. It should be recalled that in operation of the supervisory portion of the equipment, the solenoid 61 will be energized when the cashier indicates that an occupant has vacated a room and will also be energized when the housekeeper signals that the room is ready for occupancy. Therefore, although a reservation may be recorded with respect to the room in question and the wiper 27 may be in engagement with the fixed contact 29 or 31, the solenoid 24 will not be affected until the wiper 62 is stepped from the contact 63 to the contact 64 signifying that a room has been rented.

With the equipment in the position shown in FIG. 5 it indicates that a room is ready for occupancy but no reservation has been placed. Let it be assumed that the switch 13a is closed in order to register a reservation, and that the wiper 27 is advanced to engage the fixed contact 29. This will cause the reservation light 12a to be illuminated. Now, with the room ready for occupancy the yellow light 46 will also be illuminated. When the desk clerk rents the room he will operate the switch 46 which completes a circuit through the solenoid 61. The arrangement between the solenoid 61, its armature 83 and the wiper 62 is such that the wiper will leave engagement with the contact 63 before the armature 83 engages the contact 84. While the armature 83 is in engagement with the contact 84 the wiper 62 will reach the fixed contact 64. This will complete a circuit from the positive terminal of source 66 through contact 67, armature 74, wiper 62, contact 64, conductor 85, armature 83, contact 84, conductor 86, terminal 33, contact 29, wiper 27, conductor 38, junction 39, solenoid 24, conductor 81, contact 80, armature 79, armature 73, contact 71, back to the negative terminal of the source. This is equivalent to closing the switch 18 in FIG. 2 and results in energization of the solenoid 24 to step its wiper 27 from contact 29 to contact 30. This will extinguish the lamp 12a indicating that the reservation has been filled.

It should be observed that a circuit can be traced from the lower terminal 87 of the solenoid 61 through armature 79, contact 80, conductor 81, the rectifier 82, back to the opposite end of the solenoid 61. In a manner which is believed to be well-known the rectifier 82 will enable a ringing current to flow when the energizing circuit for solenoid 61 is initially broken. This serves to delay the release of the armature 83 prolonging its engagement with contact 84 and insuring operation of solenoid 24 when it is conditioned for such operation.

The purpose of the armature 83 and contact 84 is to prevent false operation of the solenoid 24. In the absence of the armature 83 and contact 84, such false operation would occur if a reservation were placed while the wiper 62 was in engagement with the contact 64 indicating that a room was rented. Under this condition the solenoid 24 would hang up when the reservation switch 13a is closed. This can be appreciated when it is realized that the terminal 33 will be connected directly with the positive terminal of the source of current 66 even though the armature 25 breaks contact with the contact 26. Since the last mentioned armature and relay contact would be open circuited the reservation light 12a would remain out even though a reservation had been placed.

It will be recalled that the operation of the relay 69 serves to reverse the polarity of the voltage applied to the system. If, with the polarity reversed, one of the switches 46, 49 or 53 should be operated it would place the full potential of the source 66 directly across the rectifier 82. For this reason the circuit completed by armature 79 engaging contact 80 is broken so long as relay 69 is actuated to reverse the polarity. This serves to interrupt the circuit both to the rectifier 82 and to the solenoid 24. As a result of the last mentioned action, false operation of the reservation portion of the system so as to improperly cancel a reservation when the wiper 62 is being stepped through three successive positions in order to correct an error is prevented.

It should also be noted that an additional advantage of the rectifier 82 is to suppress arcing at the contacts 63, 64 and 65, and, therefore, prolong the life of the assembly.

As previously mentioned, the wiper 62 breaks contact with its associated fixed contacts prior to engagement of armature 83 with contact 84. Thus, when the wiper 62 is in engagement with contact 64 and is being stepped to contact 65, it will leave 64 before armature 83 engages contact 84. In this manner no voltage will be applied to the solenoid 24 at this time.

As a modification of the circuit of FIG. 5, it is possible to replace the components in box 58 with the arrangement shown in FIG. 6. The signal lamp 88 has a terminal 89 for connection to the conductor 78 in FIG. 5. The lamp 88 in FIG. 6 has another terminal 90 for connection to the fixed contact 26 of FIG. 5. In similar manner the junction 39 in FIG. 5 would be connected to the fixed contact 91 in FIG. 6. Another fixed contact 92 is connected to the terminal 89 while a switch arm 93 is connected to the terminal 90. When the switch 93 is closed so as to bridge the gap between contacts 91 and 92 the circuit will operate in exactly the same manner as the circuit of FIG. 5.

Throughout the foregoing discussion, the electrically controlled circuit switch 23 has been illustrated as having four fixed contacts with a single wiper arm. It will be readily apparent to those skilled in the art that the number of contacts may be varied and that other structures may be employed which are capable of alternating between closed circuit and open circuit conditions in response to successive actuation or energization.

Although the present invention has been described with reference to certain preferred embodiments thereof it will be understood by those skilled in the art that numerous changes may be made therein without departing from the true spirit thereof as defined in the appended claims.

What is claimed is:

1. An electrical signalling system comprising an electrically controlled low impedance switch operator, an alternate ON-OFF switch under the control of said switch operator, a source of electrical energy, first normally open switch means connected in series with said low impedance operator across said source, an electrical indicating device connected in series with said alternate ON-OFF switch across said first switch means when said ON-OFF switch is in its ON position, and second normally open switch means connected across said indicating device operable to energize said switch operator when said ON-OFF switch is in its ON position.

2. An electrical signalling system comprising an electrical relay having a solenoid with low internal resistance and a pair of output terminals joined to contacts which sequence alternately between opened and closed position under the control of said solenoid in response to successive energization of said solenoid, a source of electrical energy, first normally open switch means connected in series with said solenoid across said source, an electrical indicating device connected in series with said output terminals across said first switch means when said contacts are in closed position, and second normally open switch means connected across said indicating device operable to energize said solenoid when said contacts are in closed position.

3. An electrical signalling system according to claim 2 wherein said indicating device is a lamp whose impedance is high compared to the internal resistance of said solenoid.

4. An electrical signalling system comprising an electrical relay having a solenoid with low internal resistance, a first pair of normally closed contacts which open when the solenoid is energized, and a set of sequencing contacts which alternate between opened and closed position under the control of said solenoid in response to successive energization of said solenoid, a source of electrical energy, first normally open switch means connected in series with said solenoid across said source, an electrical indicating device connected in series with both said first pair of contacts and said set of sequencing contacts across said first switch means when both said first pair of contacts and said sequencing contacts are in closed position, and second normally open switch means connected across said indicating device and said first pair of contacts in series operable to energize said solenoid and operate said relay when said set of sequencing contacts are in closed position.

5. An electrical system comprising an electrically controlled low impedance switch operator, an alternate ON-OFF switch under the control of said switch operator, a source of electrical energy, first normally open switch means connected in series with said low impedance operator across said source, second normally open switch means connected in series with said alternate ON-OFF switch across said first switch means when said ON-OFF switch is in its ON position, and condition responsive means responsively coupled to said alternate ON-OFF switch.

6. An electrical signalling system comprising at a first station first and second manually operable electrical switch means and first and second electrical indicating means associated respectively with said first and second switch means, at least one other station remote from said first station having a further manually operable electrical switch means, a low impedance electroresponsive operator, alternate ON-OFF switch means under the control of said operator, a source of electrical energy having a first and second terminal, means connecting said first indicating means in series with said ON-OFF switch means across said first switch means, means connecting said first terminal of the source to the junction between said first indicating means and said first switch means, means connecting said low impedance operator between said second terminal of the source and the junction between said first switch means and said ON-OFF switch means, a further electroresponsive operator, sequential switching means under the control of said further operator, means connecting said sequential switching means between said first terminal of the source and both said second and said further switch means for sequentially connecting said second and said further switch means to said first terminal, means connecting said further operator between said second terminal of the source and said second and said further switch means, means connecting said second indicating means effectively in parallel with said second switch means, and auxiliary switch means under the control of said further operator coupled for completing a circuit during the operating cycle of said further operator between the junction of said sequential switching means and said further switch means on the one hand and the junction of said ON-OFF switch means and said first indicating means on the other hand.

References Cited by the Examiner

UNITED STATES PATENTS

| | | | |
|---|---|---|---|
| Re. 24,031 | 6/1955 | Marmorstone | 340—313 X |
| 642,362 | 1/1900 | Pfatischer | 340—313 |
| 833,125 | 10/1906 | Cowles | 340—313 |
| 870,102 | 11/1907 | Herzog | 340—313 |
| 940,444 | 11/1909 | Einbigler | 340—286 |
| 1,327,837 | 1/1920 | Muschenheim et al. | 340—286 |
| 1,796,668 | 3/1931 | Sarfaty | 340—286 |
| 1,966,876 | 7/1934 | Turner | 340—286 |
| 2,262,458 | 11/1941 | Harrison | 317—137 |
| 2,542,890 | 2/1951 | Basu et al. | 340—153 |
| 2,599,623 | 6/1952 | Forrester | 340—213 |
| 2,910,238 | 10/1959 | Miles | 340—153 |
| 2,937,370 | 5/1960 | Dugan | 340—313 |
| 2,980,890 | 4/1961 | Staten | 340—153 |
| 2,987,711 | 6/1961 | Palmer | 340—379 |
| 3,051,937 | 8/1962 | Arther | 340—325 |

NEIL C. READ, *Primary Examiner.*

IRVING L. SRAGOW, *Examiner.*

R. GOLDMAN, H. I. PITTS, T. W. FEARS,
*Assistant Examiners.*